United States Patent [19]

Tamura

[11] Patent Number: 5,230,054
[45] Date of Patent: Jul. 20, 1993

[54] PRIORITY ORDER JUDGING DEVICE

[75] Inventor: Ichiro Tamura, Yokohama, Japan

[73] Assignee: Kabushiki Kaisha Toshiba, Kawasaki, Japan

[21] Appl. No.: 469,349

[22] Filed: Jan. 24, 1990

[30] Foreign Application Priority Data

Jan. 25, 1989 [JP] Japan .................. 1-15860

[51] Int. Cl.$^5$ ................................ G06F 13/18
[52] U.S. Cl. .................. 395/725; 364/242.6;
364/259.1; 364/DIG. 1; 364/937.01;
364/947.1; 364/DIG. 2
[58] Field of Search .............. 364/200, 900, 242.6,
364/259.1, DIG. 1, 937.01, 947.1, DIG. 2;
395/725, 325

[56] References Cited

U.S. PATENT DOCUMENTS

| | | | |
|---|---|---|---|
| 4,334,288 | 6/1982 | Booher | 364/900 |
| 4,594,590 | 6/1986 | Van Hatten et al. | 340/825.51 |
| 4,829,467 | 5/1989 | Ogata | 364/900 |

FOREIGN PATENT DOCUMENTS

WO84/02239 6/1984 World Int. Prop. O.

OTHER PUBLICATIONS

*IBM Technical Disclosure Bulletin*, vol. 29, No. 3, Aug. 1986, New York, US, pp. 1361-1362, "Round Robin Selection Device Using a Feedback Priority Encoder".

Primary Examiner—Michael R. Fleming
Assistant Examiner—Glenn A. Auve
Attorney, Agent, or Firm—Foley & Lardner

[57] ABSTRACT

Each priority order signal (a code signal having a plurality of digits) is processed at each gate circuit in the following manner. The level of a K-th digit input code signal among the priority order signals is checked and the level of a K-th order judgement result signal is fed-back from a judgement circuit. In the first case where the former level is "0" and the latter level is "1", "0" (or "1") is outputted as the (K+1)-th, (K+2)-th, ... order output signals and supplied to the judgement circuit. In the cases other than the first case, the inputted (K+1)-th digit input code signal is outputted as it is as the (K+1)-th order output signal and supplied to the judgement circuit. The judgement circuit performs a logical OR (or NAND) operation for each order and the results are outputted as judgement result signals.

10 Claims, 8 Drawing Sheets

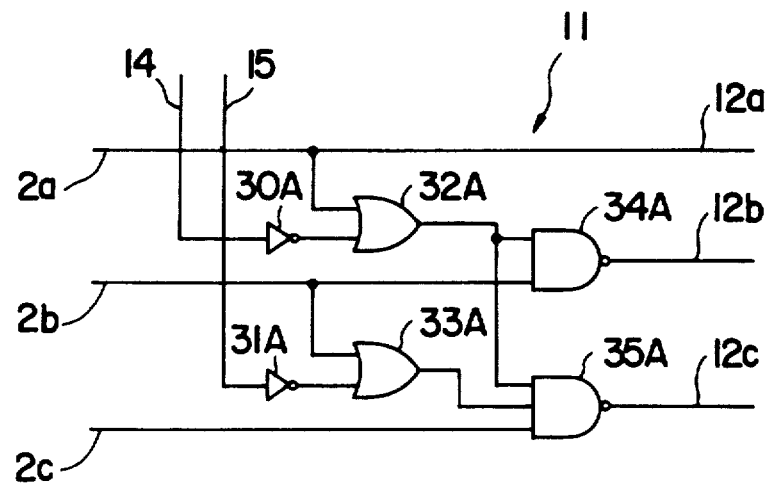
F I G. 12
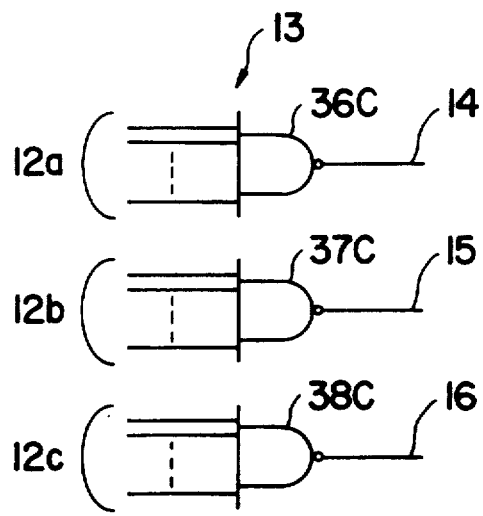
F I G. 13

PRIORITY ORDER JUDGING DEVICE

FIELD OF THE INVENTION

The present invention relates to a priority order judging device, and more particularly to a priority order judging device suitable for use in judging a coded priority order signal.

BACKGROUND OF THE INVENTION

FIG. 4 is the block diagram showing a priority order judging device according to a background art. In FIG. 4, each channel 1, 1, ... outputs a priority order code signal 2 (2a to 2c), 2 (2a to 2c), ... (refer to FIG. 5). Each decoder 3, 3, ... decodes the priority order code signal 2, 2, ... to output it as a priority decode signal 4 (4a to 4h), 4 (4a to 4h), ... (refer to FIG. 5). A judgement circuit 5 judges the priority order of the priority order decode signal 4, 4, ... and outputs the highest priority order signal as a judged priority order signal 6 (6a to 6h). An encoder 7 encodes the judged priority order signal 6 and outputs it as judgement result code signals 8, 9 and 10.

The decoders 3, judgement circuit 5 and encoders 7 may be those generally used, examples of which are shown in FIGS. 5 to 7. These circuits are generally used, so a detailed description for them is omitted. As seen from FIG. 5, the decoder 3 is constructed of three inverters $2A_1$ to $2A_3$ and eight NOR gates $3B_1$ to $3B_8$. As seen from FIG. 6, the judgement circuit 5 is constructed of eight NOR gates $5A_1$ to $5A_8$. The NOR gate $5A_1$ is inputted with signals 4a, 4a, ... of the decode signals 4, 4, .... The NOR gate $5A_2$ is inputted with signals 4b, 4b, ... of the decode signals 4, 4, .... Similarly, the last NOR gate $5A_8$ is inputted with decode signals 4h, 4h, ... of the decode signals 4, 4, .... The NOR gates $5A_1$ to $5A_8$ output judged priority order signals 6a to 6h, respectively. As seen from FIG. 7, the encoder 7 is constructed of an inverter 7A, six NOR gates $7B_1$ to $7B_6$, and the NOR gates $7C_1$ to $7C_3$.

The order judging device according in the background art has been constructed heretofore as described above. It is therefore necessary to provide the decoder 3 for each channel, and the encoder 7 for outputting the judgement result code signals 8, 9 and 10, resulting in a large circuit scale of the device. Further, the priority order decode signals 4, 4, ... outputted from the decoders 3, 3, ... and the judged priority order signals 6 outputted from the judgement circuit 5, are decode signals so that a number of signal lines for the signal transfer between circuits becomes necessary. A number of signal lines require a large space. Furthermore, the judgement circuit 5 itself becomes complicated because the highest priority order signal should be found among a number of priority order decode signals inputted from a number of signal lines.

SUMMARY OF THE INVENTION

The present invention has been made in consideration of the above circumstances. It is therefore an object of the present invention to provide a priority order judging device with a small circuit scale and which is capable of judging the priority order of priority order code signals while maintaining them in the form of code signals.

According to the device of this invention, each priority order signal (a code signal having a plurality of digits) is processed at each gate circuit in the following manner. The level of a K-th digit input code signal among the priority order signals is checked and the level of a K-th order judgement result signal is fed-back from a judgement circuit. In the first case where the former level is "0" and the latter level is "1", "0" (or "1") is outputted as the (K+1)-th, (K+2)-th, ... order output signals and supplied to the judgement circuit. In the cases other than the first case, the inputted (K+1)-th digit input code signal is outputted as the (K+1)-th order output signal and supplied to the judgement circuit. The judgement circuit performs a logical OR (or NAND) operation for each order and the results are outputted as judgement result signals.

According to the present invention, the priority order judgement can be carried out by using priority order code signals while maintaining them in the form of code signals. It is therefore unnecessary to provide an encoder and decoders, and their peripheral circuits including wiring, thereby allowing a compact device and simple circuit arrangement.

BRIEF DESCRIPTION OF THE DRAWINGS

FIGS. 12 and 13 are block diagrams of the gate circuit and judgement circuit according to the fourth embodiment of this invention.

DESCRIPTION OF THE PREFERRED EMBODIMENTS

Figure 1:
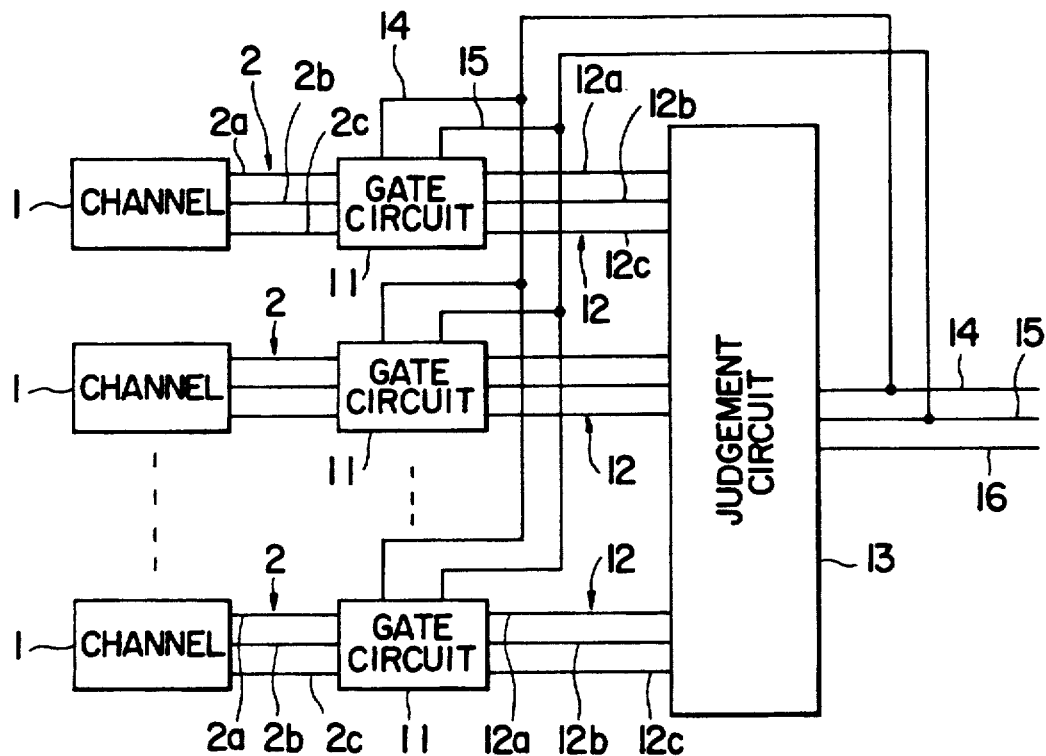
FIG. 1 is a block diagram showing an embodiment of the priority order judging device according to the present invention.

FIG. 1 is a block diagram showing an embodiment of this invention. Each priority order code signal 2 (2a to 2c), 2 (2a to 2c), outputted from each channel 1, 1, ... has eight levels. Each code signal 2, 2, ... is therefore coded as a three bit signal, including a highest code signal 2a, middle code signal 2b and lowest code signal 2c. These code signals 2, 2, ... are supplied to feedback circuits (gate circuits) 11, 11, ... which in turn output the modified priority order code signals 12 (12a to 12c), 12 (12a to 12c), ... to a judgement circuit 13. The judgement circuit 13 judges the priority order on the basis of the code signals 12, 12, ..., and outputs a signal of highest priority order as judgement result code signals (14 to 16), namely, a highest order judgement result code signal 14, middle order judgement result code signal 15, and lowest order judgement result code signal 16. The code signals 14 and 15 among the code signals 14 to 16 are fed back to the gate circuits 11, 11, .... In accordance with the fed-back code signals 14 and 15, the gate circuits 11, 11, ... output the priority order code signals 12 (12a to 12c), 12 (12a to 12c), ... as it is, or output them by changing their priority order to a lower order (by forcibly changing level "1" to level "0").

Figure 2:
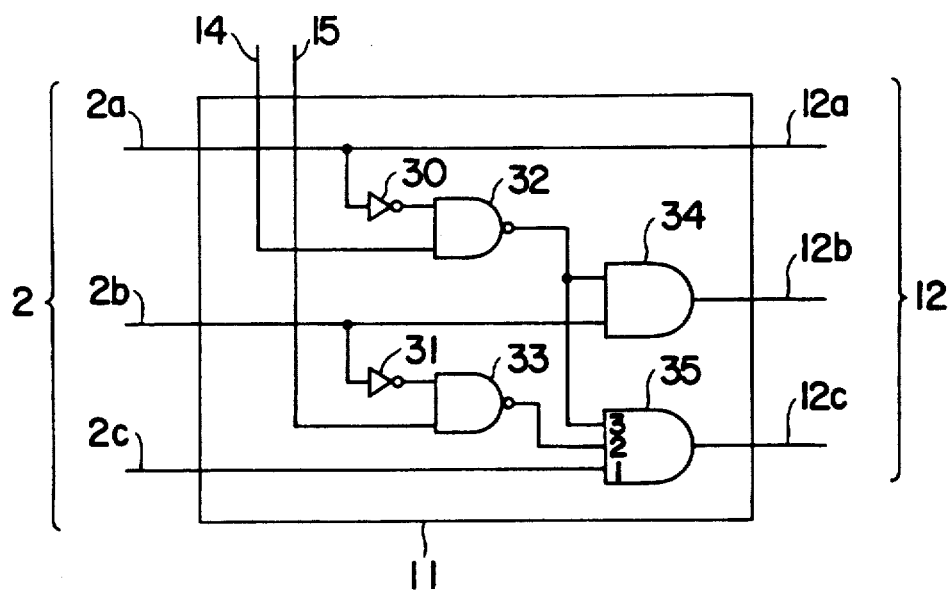
FIG. 2 is a block diagram showing a first embodiment of the gate circuit shown in FIG. 1.

FIG. 2 shows an example of the gate circuit 11. The highest code signal 2a directly becomes the modified highest order code signal 12a. The middle code signal 2b is applied to an AND gate 34 to become the modified middle order code signal 12b. To the other input of this AND gate 34, an output from a NAND gate 32 (a control signal to reflect the judgement result of the highest code signal) is applied. A highest order judgement result code signal 14 is applied to one input terminal of the NAND gate 32, and the highest code signal 2a is applied to the other input terminal via an inverter 30. The middle code signal 2b is therefore controlled by the signals 2a and 14, and outputted as the modified middle order code signal 12b, as it is or after being forcibly changed from level "1" to level "0".

The lowest code signal 2c is applied to a first input terminal of an AND gate 35 and controlled by it to become the modified lowest order code signal 12c. To the second input terminal of this AND gate 35, an output from a NAND gate 33 (control signal to reflect the judgement result of the middle code signal 2b) is applied. The middle order judgement result signal 15 is applied to one input terminal of the NAND gate 33, and the middle code signal 2b is applied to the other input terminal via an inverter 31. To the third input terminal of the NAND gate 35, an output from the NAND gate 32 is applied. The lowest code signal 2c is therefore controlled by signals 2a, 2b, 14 and 15, and outputted directly as the modified lowest order code signal 12c, as it is or after being forcibly changed from level "1" to level "0".

TABLE 1

$$\left( \begin{array}{l} \#2a = 0 \\ \#2a = 1 \end{array} \right. \left( \begin{array}{l} \#14 = 0 \rightarrow \#12b = \#2b \\ \#14 = 1 \rightarrow \#12b = 0 \end{array} \right.$$

$$\left( \#14 = 0 \rightarrow \#12b = \#2b \right.$$

TABLE 1-continued $$\#14 = 1 \rightarrow \#12b = \#2b$$

Table 1 shows how the middle code signal 2b is controlled by the signals 2a and 14 and outputted as the modified middle order code signal 12b. As seen from Table 1, if the highest code signal 2a is level "0" and the highest order judgement signal 14 is level "1", the modified middle code signal 12b is outputted as level "0" irrespective of the value of the middle code signal 2b. In the other cases, the middle code signal 2b is directly outputted as it is to become the modified middle order code signal 12b.

TABLE 2

$$\#2a = 0 \begin{cases} \#14 = 0 \begin{cases} \#2b = 0 \begin{cases} \#15 = 0 \rightarrow \#12c = \#2c \\ \#15 = 1 \rightarrow \#12c = 0 \end{cases} \\ \#2b = 1 \begin{cases} \#15 = 0 \rightarrow \#12c = \#2c \\ \#15 = 1 \rightarrow \#12c = \#2c \end{cases} \end{cases} \\ \#14 = 1 \begin{cases} \#2b = 0 \begin{cases} \#15 = 0 \rightarrow \#12c = 0 \\ \#15 = 1 \rightarrow \#12c = 0 \end{cases} \\ \#2b = 1 \begin{cases} \#15 = 0 \rightarrow \#12c = 0 \\ \#15 = 1 \rightarrow \#12c = 0 \end{cases} \end{cases} \end{cases}$$

$$\#2a = 1 \begin{cases} \#14 = 0 \begin{cases} \#2b = 0 \begin{cases} \#15 = 0 \rightarrow \#12c = \#2c \\ \#15 = 1 \rightarrow \#12c = 0 \end{cases} \\ \#2b = 1 \begin{cases} \#15 = 0 \rightarrow \#12c = \#2c \\ \#15 = 1 \rightarrow \#12c = \#2c \end{cases} \end{cases} \\ \#14 = 1 \begin{cases} \#2b = 0 \begin{cases} \#15 = 0 \rightarrow \#12c = \#2c \\ \#15 = 1 \rightarrow \#12c = 0 \end{cases} \\ \#2b = 1 \begin{cases} \#15 = 0 \rightarrow \#12c = \#2c \\ \#15 = 1 \rightarrow \#12c = \#2c \end{cases} \end{cases} \end{cases}$$

Table 2 shows how the lowest bit signal 2c is controlled by the signals 2a, 2b, 14 and 15 and outputted as the modified lowest order code signal 12c. As seen from Table 2, if one of or all of the two conditions is satisfied, one being that the highest code signal 2a is level "0" and the highest order judgement signal 14 is level "1" and the other being that the middle code signal 2b is level "0" and the middle order judgement signal 15 is level "1", the modified lowest order code signal 12c becomes level "0" irrespective of the value of the lowest code signal 2c. In the other cases, the lowest code signal 2c is outputted as it is to become the modified lowest order code signal 12c.

Figure 3:
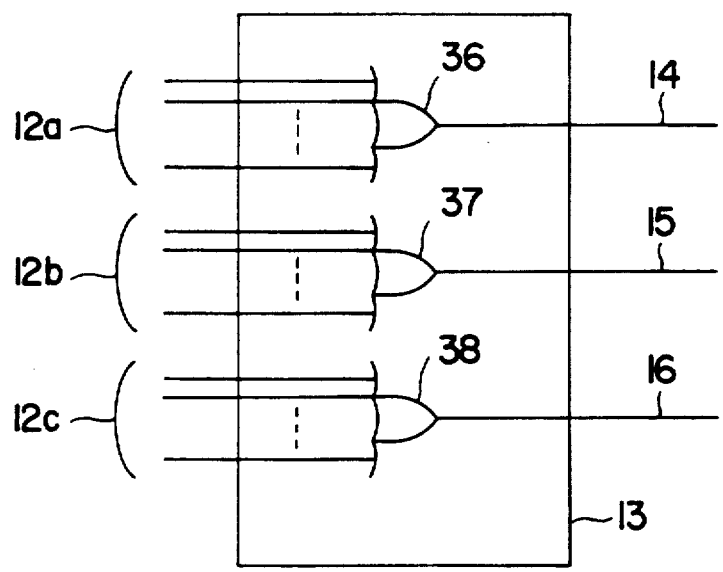
FIG. 3 is a block diagram showing a first embodiment of the judgement circuit shown in FIG. 1.
Figure 4:
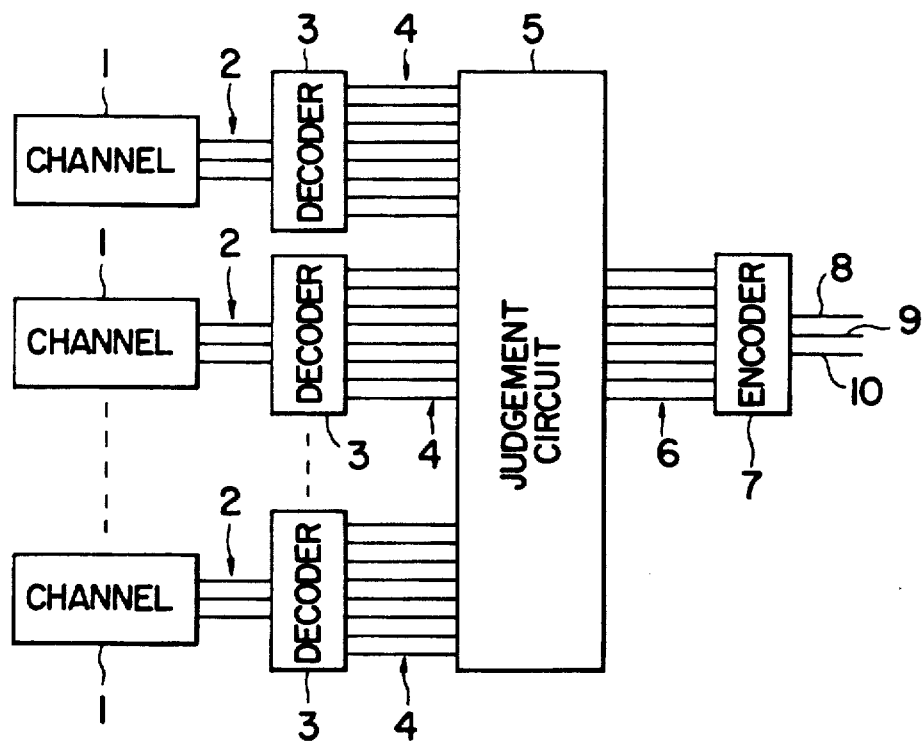
FIG. 4 is a block diagram showing a priority order judgement device according to the background art.
Figure 5:
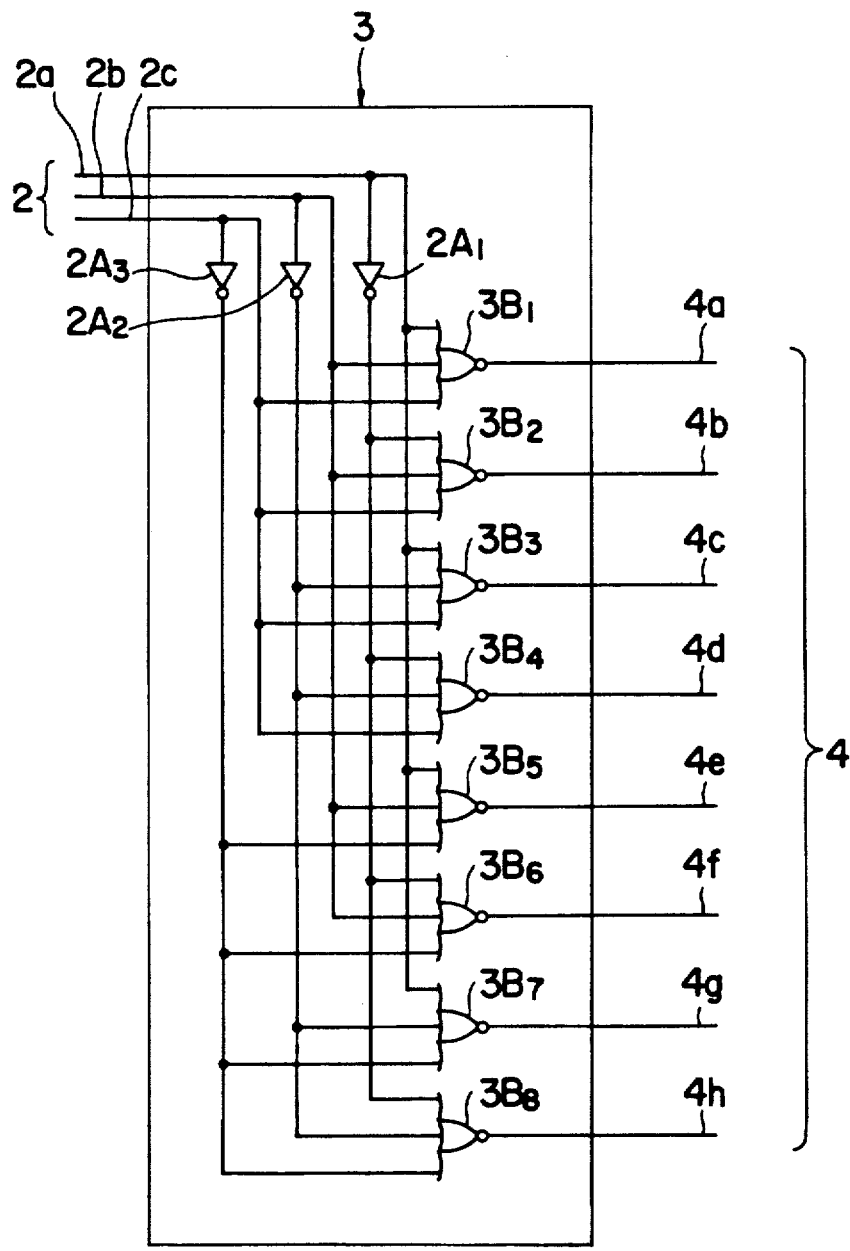
FIGS. 5 to 7 show examples of the decoder, judgement circuit and encoder shown in FIG. 4.
Figure 6:
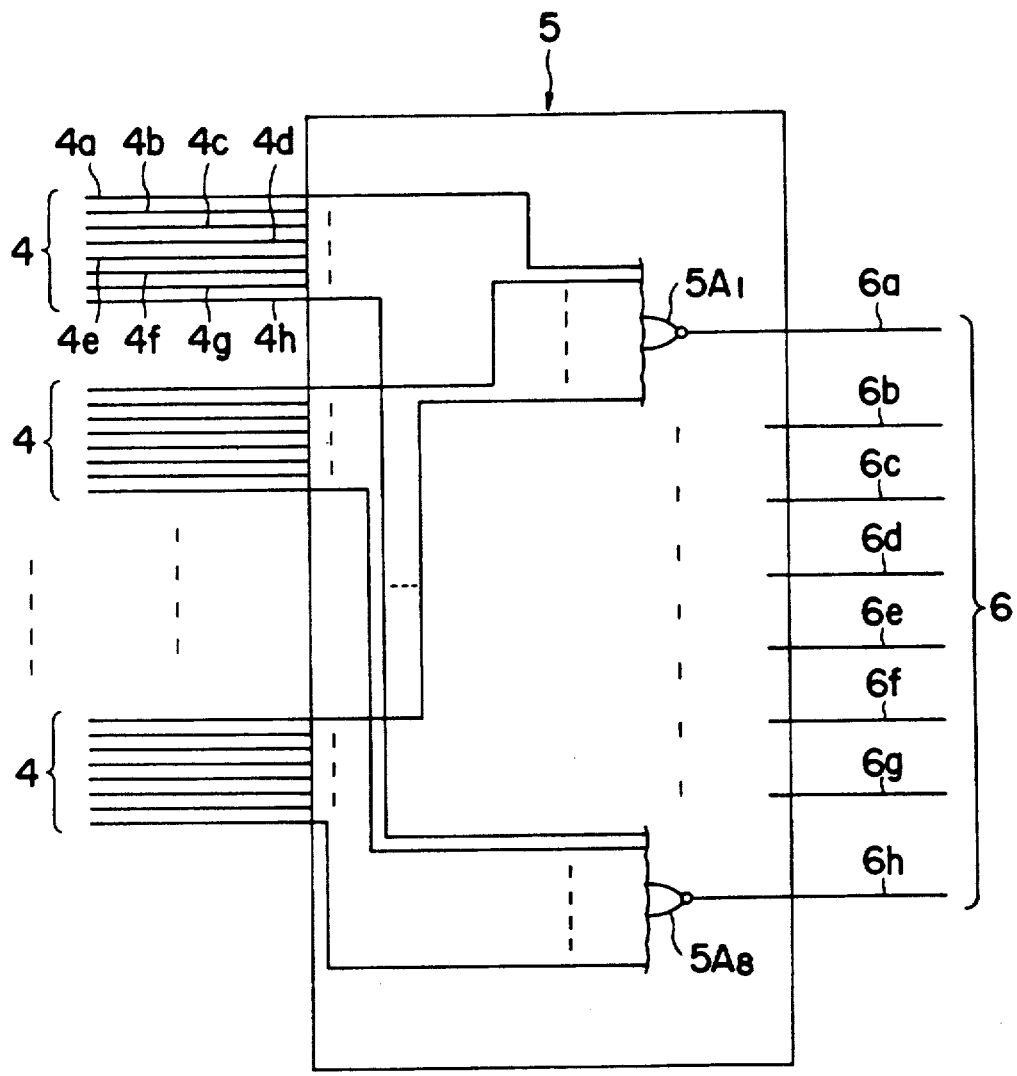
Figure 7:
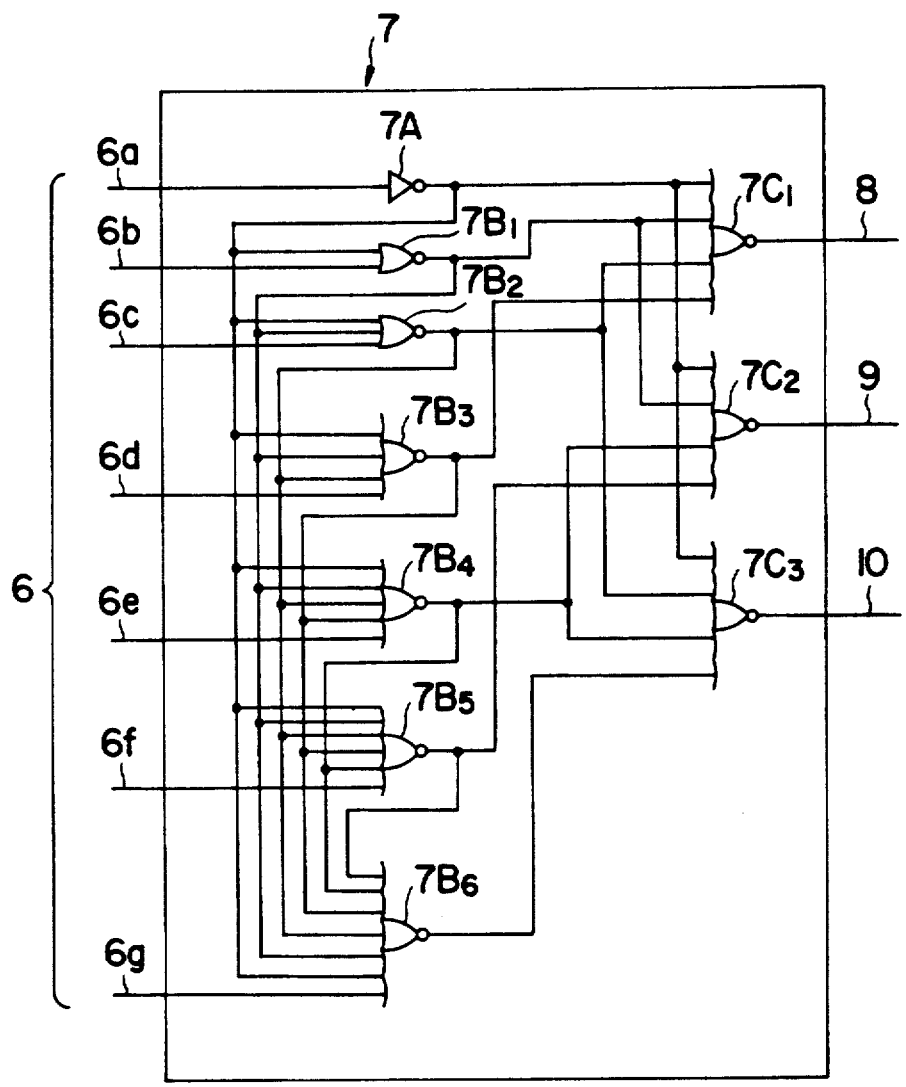

FIG. 3 shows the detail of the judgement circuit 13 shown in FIG. 1. This circuit 13 includes OR gates 36 to 38. The highest order code signals 12a, 12a, ... outputted from the gate circuits 11, 11, ... are inputted to the input terminals of the OR gate 36 which in turn outputs the highest order judgement result signal 14. The modified middle and lowest order code signals 12b, 12b, ... and 12c, 12c, ... outputted from the gate circuits 11, 11, ... are inputted to the input terminals of the OR gates 37 and 38, respectively, which in turn output the middle and lowest order judgement result signals 15 and 16.

With the device constructed as above, the priority order judgement is carried out as in the following.

Namely, the priority order code signals 2 (2a to 2c), 2 (2a to 2c), ... are applied from the channels 1, 1, ... to the gate circuits 11, 11, .... The highest code signals 2a, 2a, ... of the priority order code signals 2, 2, ... pass the gate circuit 11, 11, ... and applied as the highest order code signals 12a, 12a, ... to the OR gate 36 of the judgement circuit 13 which in turn outputs the highest order judgement result signal 14. This signal 14 is fed back to the gate circuits 11, 11, .... The gate circuits 11, 11, ... perform their control in accordance with the highest order judgement result signal 14 and highest code signal 2a, to thereby output from the AND gates 34, 34, ... the modified middle order code signals 12b, 12b, .... These signals 12b, 12b, ... are applied to the input terminals of the OR gate 37 of the judgement circuit 13. The OR gate 37 outputs the middle order judgement result signal 15 which is fed back to the gate circuits 11, 11, .... The gate circuits 11, 11, ... perform their control in accordance with the highest and middle order judgement result signals 14 and 15 and highest and middle code signals 2a and 2b, to thereby output from the AND gates 35, 35, ... the modified lowest order code signals 12c, 12c, .... These signals 12c, 12c, ... are applied to the input terminals of the OR gate 38 of the judgement circuit 13. The OR gate 38 outputs the highest order judgement result signal 16.

In the above manner, the priority order judgement for the priority order code signals 2, 2, ... from the channels 1, 1, ... is carried out from the higher code signal (2a, 2a, ...) to the lower code signal (2c, 2c, ... ). A channel of highest priority order can thus be discriminated among the channels 1, 1, ....

In the above embodiment, the priority order code signal 2 has been assumed as a three digit code signal. It is obvious that a larger digit number may be used by increasing the number of digits of the judgement logics of the feedback circuit 11. Furthermore, the logical elements used in the embodiment become different in accordance with the structure and logical conditions of the priority order code signal 2. In place of the logical element of this embodiment, a combination of elements of different logical conditions may be used therefore in accordance with the priority order code signal to be used.

According to the present invention, the priority order judgement for the priority order code signals from channels can be carried out while maintaining them in the form of coded signals, so that wirings of the circuit and its space can be reduced. Furthermore, it becomes unnecessary to provide a decoder for each channel and an encoder therefor, thereby making the circuit smaller. Furthermore, the judgement circuit can be configured only with OR gates, thereby considerably simplifying the circuit arrangement when compared with a conventional circuit.

As described above, when compared with a conventional device, the device of this invention can judge the priority order with a simple, small in scale, and compact to thereby improve the system reliability.

The gate circuit 11 and the judgement circuit 13 of FIG. 1 may use various circuits shown in FIGS. 8 to 13 in addition to those shown in FIGS. 2 and 3.

Figure 8:
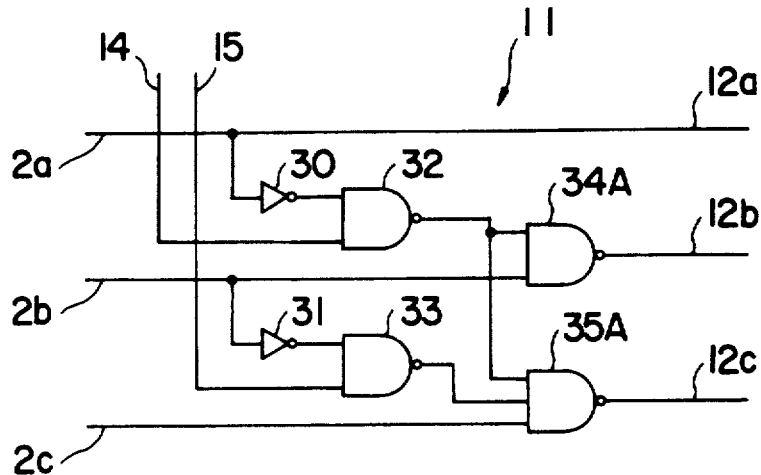
FIGS. 8 and 9 are block diagrams of the gate circuit and judgement circuit according to the second embodiment of this invention.
Figure 9:
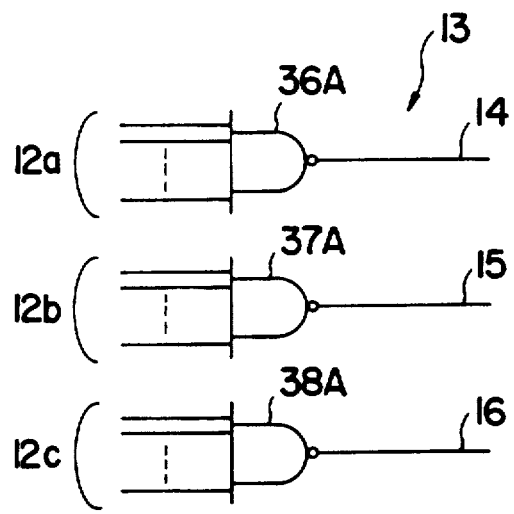

FIGS. 8 and 9 show the circuits according to the second embodiment. The gate circuit 11 shown in FIG. 8 uses NAND gates 34A and 35A in place of the AND gates 34 and 35 shown in FIG. 2. The judgement circuit 11 shown in FIG. 9 therefore uses NAND gates 36A to 38A in place of the OR gates 36 to 38 shown in FIG. 3.

The other structure of the circuits shown in FIGS. 8 and 9 is the same as that of FIGS. 2 and 3. Equivalent elements to those shown in FIGS. 2 and 3 are represented by using identical reference numbers, and the description therefor is omitted.

Figure 10:
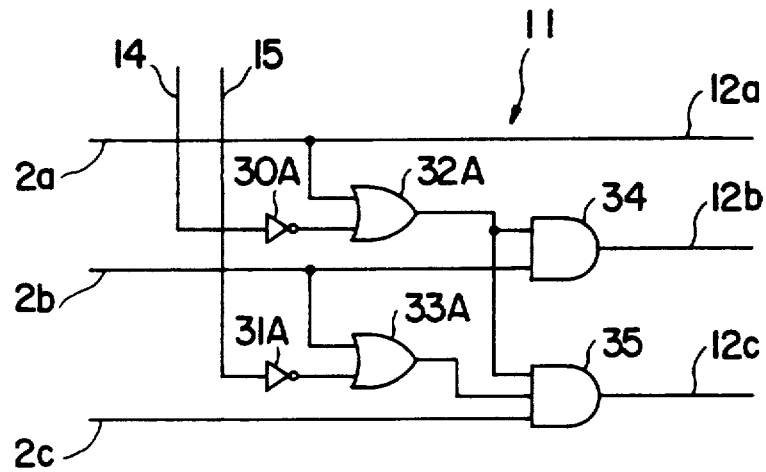
FIGS. 10 and 11 are block diagrams of the gate circuit and judgement circuit according to the third embodiment of this invention.
Figure 11:
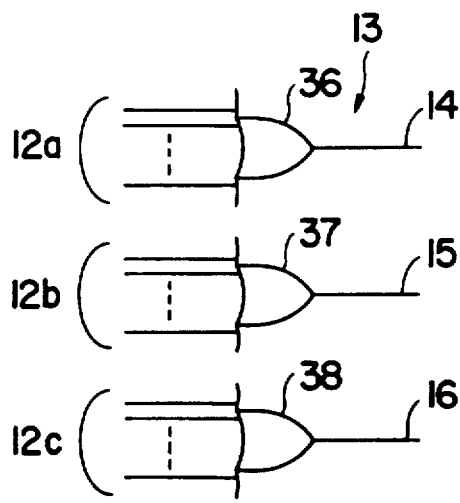

FIGS. 10 and 11 show the circuits according to the third embodiment. The gate circuit 11 shown in FIG. 10 uses inverters 30A and 31A and OR gates 32A and 33A in place of the inverters 30 and 31 and NAND gates 32 and 33 shown in FIG. 2. In the gate circuit 11 shown in FIG. 10, similar to the circuit shown in FIG. 2, the code signals 12a to 12c are outputted from the AND gates 34 and 35 so that the judgement circuit 13 shown in FIG. 11 is used which is the same as that shown in FIG. 3.

FIGS. 12 and 13 show the circuits according to the fourth embodiment. The gate circuit 11 shown in FIG. 12 is constructed of a combination of the inverters 30A and 31A and OR gates 32A and 33A shown in FIG. 10 and the NAND gates 34A and 35A shown in FIG. 12. In the gate circuit 11 shown in FIG. 12, similar to the circuit shown in FIG. 8, the code signals 12a to 12c are outputted from the NAND gates 34A and 35A so that the judgement circuit 13 shown in FIG. 13 is used which is the same as that shown in FIG. 9.

The gate circuit 11 (FIG. 10) of the third embodiment operates in the same manner as the gate circuit 11 (FIG. 2) of the first embodiment.

The gate circuit 11 (FIG. 8) of the second embodiment and the gate circuit 11 (FIG. 12) of the fourth embodiment operate in the following manner. Namely, if the k-th digit input code signal is level "0" and the k-th digit judgement result signal is level "1", a level "1" signal is outputted for all (k+1)-th, (k+2)-th, (k+3)-th, digit output code signals (in the case of the first embodiment, "0" level signal is outputted). In the other cases, the (k+1)-th digit input code signal is outputted as it is as the (k+1)-th output code signal.

Reference signs in the claims are intended for better understanding and shall not limit the scope.

What is claimed is:

1. A priority order judging device, comprising:
   first to N-th gate circuits (where N is a positive integer equal to or greater than 2),
   each of said first to N-th gate circuits receiving one priority order signal of first to N-th priority order signals,
   each of said first to N-th priority order signals having first to M-th input digital code signals (where M is a positive integer equal to or greater than 2),
   said first to N-th gate circuits outputting
      a first input digital code signal, as it is, as a first output order code signal and
      a second input digital code signal and additional input digital code signals, as they are, or binary "0" level signals as second to M-th output order code signals; and
   a judgement circuit for receiving said first to M-th output order code signals from said first to N-th gate circuits,
   said judgement circuit including first to M-th OR circuits,
   an L-th OR circuit of said first to M-th OR circuits (where L is a positive integer equal to or less than M) receiving N L-th output order code signals from said first to N-th gate circuits and outputting an L-th order judgement result code signal as an output of said priority order judging device, said judgement circuit feeding back first to M-1th order judgement result code signals to said gate circuits;

wherein, in a first case where a K-th input digital code signal (where K is a positive integer less than M) inputted to each gate circuit of said gate circuits is binary "0" and a K-th order judgement result code signal fed back from said judgement circuit is binary "1", each gate circuit of said gate circuits outputs binary "0" as a K+1-th to M-th output order code signal, and, in a second case not including said first case, each gate circuit of said gate circuits outputs a K+1-th input digital code signal, as it is, as a K+1-th output order code signal.

2. A priority order judging device, according to claim 1, wherein each gate circuit of said gate circuits includes M-1 AND gates for outputting said second to M-th output order code signals, a K-th AND gate of said M-1 AND gates receiving a K-th input digital code signal and K-1 input signals, said K-1 input signals comprising K-1 NAND logical signals, each of said NAND logical signals representing a NAND function of an inverse of a J-th input digital code signal inputted to said gate circuits (where J is a positive integer less than K-1) and a J-th order judgement result code signal fed back from said judgement circuit.

3. A priority order judging device according to claim 2, wherein each of said gate circuits has an input terminal to which said first input digital code signal is inputted, and an output terminal from which said first output order code signal is outputted, said input and output terminals being connected directly to each other.

4. A priority order judging device, according to claim 1, wherein each gate circuit of said gate circuits includes M-1 AND gates for outputting said second to M-th output order code signals, a K-th AND gate of said M-1 AND gates receiving a K-th input digital code signal and K-1 input signals, said K-1 input signals comprising K-1 OR logical signals, each of said OR logical signals representing an OR function of a J-th input digital code signal inputted to said gate circuits (where J is a positive integer less than K-1) and an inverse of a J-th order judgement result code signal.

5. A priority order judging device according to claim 4, wherein each of said gate circuits has an input terminal to which said first input digital code signal is inputted, and an output terminal from which said first output order code signal is outputted, said input and output terminals being connected directly to each other.

6. A priority order judging device, according to claim 1, wherein each gate circuit of said gate circuits includes M-1 NAND gates for outputting said second to M-th output order code signals, a K-th NAND gate of said M-1 NAND gates receiving a K-th input digital code signal and K-1 input signals, said K-1 input signals comprising K-1 NAND logical signals, each of said NAND logical signals representing a NAND function of an inverse of a J-th input digital code signal inputted to said gate circuits (where J is a positive integer less than K-1) and a J-th order judgement result code signal fed back from said judgement circuit.

7. A priority order judging device according to claim 6, wherein each of said gate circuits has an input terminal to which said first input digital code signal is inputted, and an output terminal from which said first output order code signal is outputted, said input and output terminals being connected directly to each other.

8. A priority order judging device, comprising:

first to N-th gate circuits (where N is a positive integer equal to or greater than 2), each of said first to N-th gate circuits receiving one priority order signal of first to N-th priority order signals, each of said first to N-th priority order signals having first to M-th input digital code signals (where M is a positive integer equal to or greater than 2), said first to N-th gate circuits outputting a first input digital code signal, as it is, as a first output order code signal and a second input digital code signal and additional input digital code signals, as they are, or binary "0" level signals as second to M-th output order code signals; and a judgement circuit for receiving said first to M-th output order code signals from said first to N-th gate circuits, said judgement circuit including first to M-th NAND circuits, an L-th NAND circuit of said first to m-th NAND circuit (where L is a positive integer equal to or less than M) receiving N L-th output order code signals from said first to N-th gate circuits and outputting an L-th order judgement result code signal as an output of said priority order judging device, said judgement circuit feeding back first to M-1th order judgement result code signals to said gate circuits;

wherein, in a first case where a K-th input digital code signal (where K is a positive integer less than M) inputted to each gate circuit of said gate circuits is binary "0" and a K-th order judgement result code signal fed back from said judgement circuit is binary "1", each gate circuit of said gate circuits outputs binary "1 " as a K+1-th to M-th output order code signal, and, in a second case not including said first case, each gate circuit of said gate circuits outputs a K+1th input digital code signal, as it is, as a K+1-th output order code signal.

9. A priority order judging device, according to claim 8, wherein each gate circuit of said gate circuits includes M-1 NAND gates for outputting said second to M-th output order code signals, a K-th NAND gate of said M-1 NAND gates receiving a K-th input digital code signal and K-1 input signals, said K-1 input signals comprising K-1 OR logical signals, each of said OR logical signals representing an OR function of a J-th input digital code signal inputted to said gate circuits (where J is a positive integer less than K-1) and an inverse of a J-th order judgement result code signal.

10. A priority order judging device according to claim 9, wherein each of said gate circuits has an input terminal to which said first input digital code signal is inputted, and an output terminal from which said first output order code signal is outputted, said input and output terminals being connected directly to each other.

* * * * *